J. C. DUNCAN.
BY-PASS VALVE FOR PRESSURE REDUCING VALVES.
APPLICATION FILED MAY 21, 1914.
1,120,918.
Patented Dec. 15, 1914.
2 SHEETS—SHEET 1.
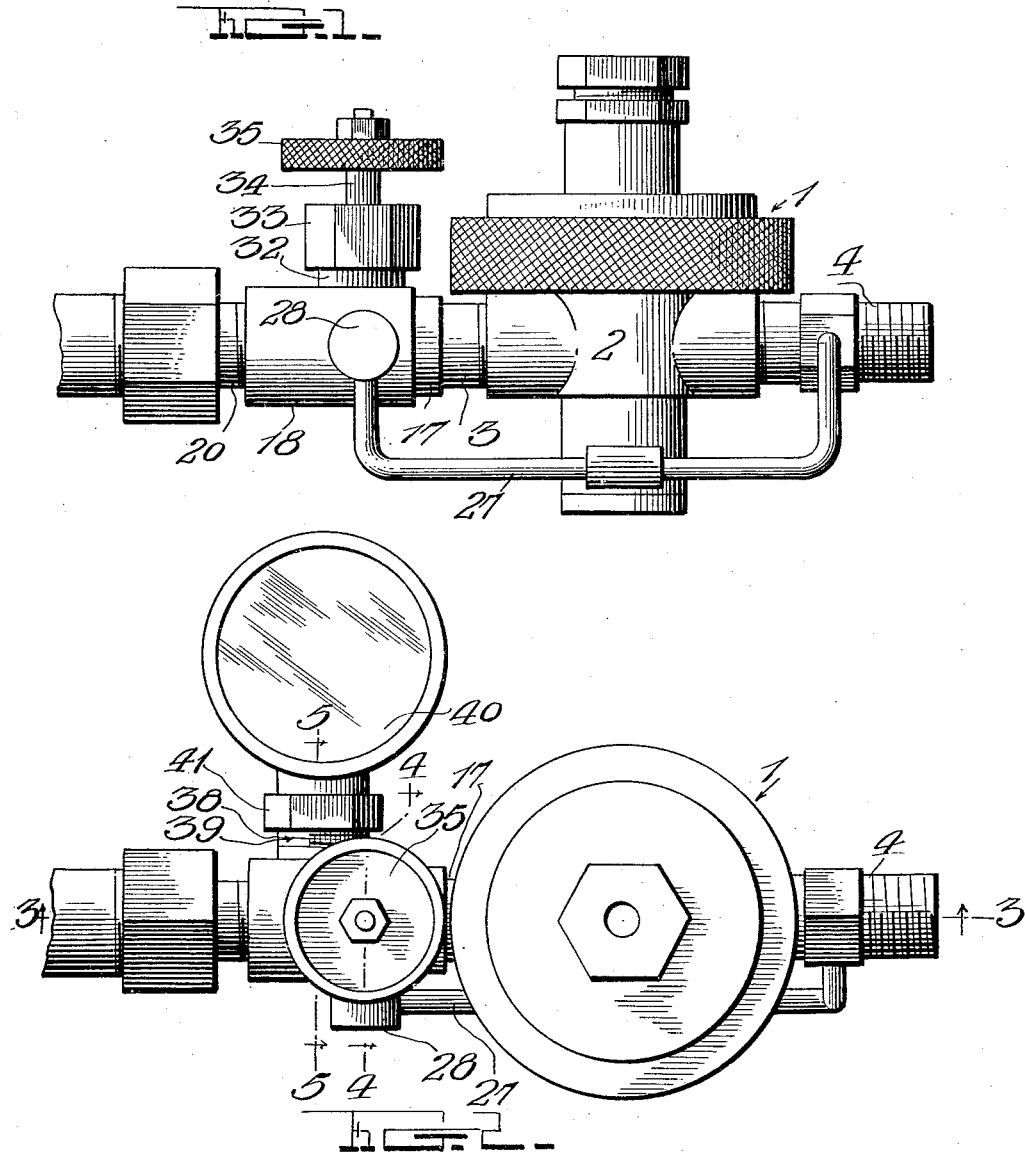
Inventor
John C. Duncan
Witnesses
H. Woodard
By H. B. Willson &co
Attorneys J. C. DUNCAN.
BY-PASS VALVE FOR PRESSURE REDUCING VALVES.
APPLICATION FILED MAY 21, 1914.
1,120,918.
Patented Dec. 15, 1914.
2 SHEETS—SHEET 2.
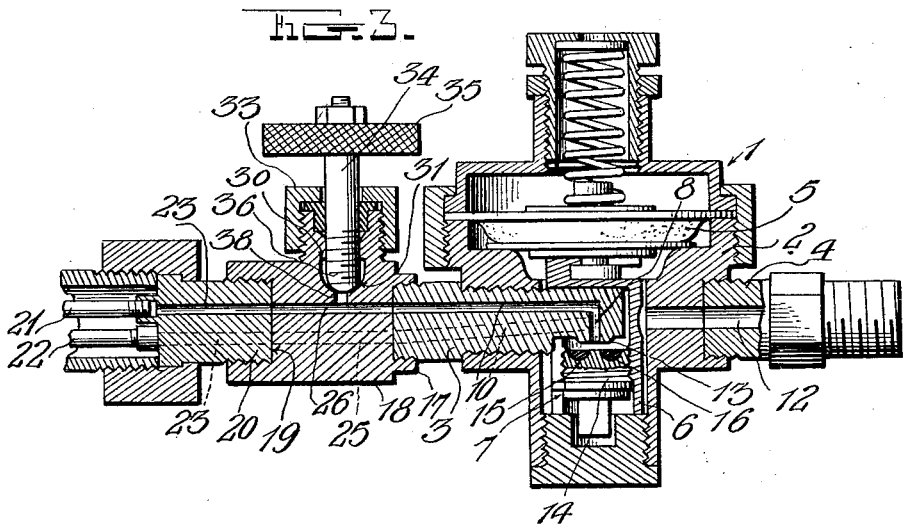
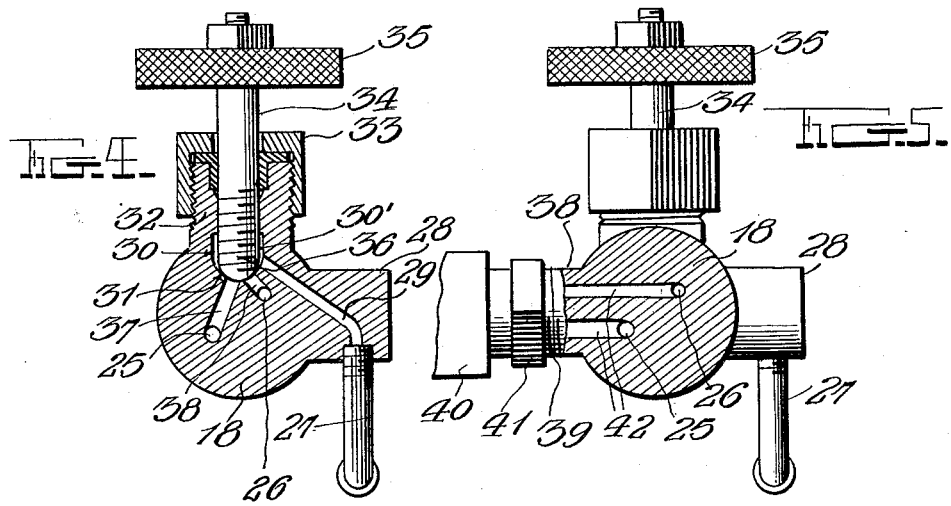
Witnesses
H. Woodard
Inventor
John C. Duncan
By H. R. Wilson &co.
Attorneys

UNITED STATES PATENT OFFICE.

JOHN C. DUNCAN, OF BENTON, ILLINOIS.

BY-PASS VALVE FOR PRESSURE-REDUCING VALVES.

1,120,918. Specification of Letters Patent. Patented Dec. 15, 1914.

Application filed May 21, 1914. Serial No. 840,061.

*To all whom it may concern:*

Be it known that I, JOHN C. DUNCAN, a citizen of the United States, residing at Benton, in the county of Franklin and State of Illinois, have invented certain new and uesful Improvements in By-Pass Valves for Pressure-Reducing Valves; and I do declare the following to be a full, clear, and exact description of the invention, such as will enable others skilled in the art to which it appertains to make and use the same.

My invention relates broadly to improvements in pressure reducing valves and more particularly to by-pass valves to be used in conjunction therewith.

It is a well-known fact that the forms of pressure reducing valves now employed in connection with mine rescue apparatus often become clogged thereby preventing the proper passage of gas therethrough. In view of this fact it becomes expedient to provide a by-pass around the reducing valve.

The primary object of my invention is to provide a valve for such a by-pass so constructed as to allow the two gases, oxygen and nitrogen, to flow from the supply pipe into a mixing chamber from which they may be conducted through the by-pass and around the pressure reducing valve as before suggested.

A secondary object of the invention is to construct the by-pass valve in such a manner as to accommodate a pressure gage.

A still further object of the invention is to construct the device in the most simple manner consistent with its proper operation.

With these objects in view, the invention resides in certain novel features of construction and combination herein described and claimed and shown in the drawings wherein:

Figure 1 is a side elevation of a pressure reducing valve showing the application of my invention thereto. Fig. 2 is a plan view of the parts illustrated in Fig. 1. Fig. 3 is a central vertical longitudinal section taken upon the line 3—3 of Fig. 2; and Figs. 4 and 5 are transverse sections taken respectively upon the lines 4—4 and 5—5 of Fig. 2.

In the accompanying drawings, I have illustrated my invention as employed in connection with a pressure reducing valve 1, the latter including the usual casing 2, inlet and outlet pipes 3 and 4 to and from said casing, diaphragm 5 carrying the usual split sleeve 6, and a valve 7 carried by said sleeve and adapted to close or open the discharge ends 8 of oxygen and nitrogen supply ducts 10. As is usual with devices of this character, but one discharge duct is employed, the latter being here indicated at 12.

As clearly seen in Fig. 3, the inner end of the gas supply pipe 3 projects through the slit in the sleeve 6 and is provided with depending lugs or bosses 13 through which the ducts 10 discharge, said bosses being disposed in the inward path of the valve 7 which latter is here shown in the form of an externally threaded plug 14 which is provided, on its inner end, with a ring shaped recess 15 within which a suitable packing 16 is arranged, said packing serving to effectually check the flow of gas from the ducts 10 when the diaphragm 5 is moved outwardly by pressure within the casing. The remaining features of the pressure reducing valve are of common construction and it is thought that the preceding description, taken in connection with the accompanying drawings, will disclose its construction to the necessary extent.

As clearly shown in the various figures of the drawings, the outer end of the supply pipe 3 is externally threaded and engaged with a threaded socket 17 which is formed in one end of a substantially cylindrical valve casing 18, the opposite end of said casing being formed with a similar socket 19 in which one member 20 of a coupling is arranged, the complementary member of said coupling coacting with the member 20 to provide attaching means for the hydrogen and nitrogen supply pipes 21 and 22. The member 20 is provided with independent inlet openings 23 which establish communication between the pipes 21 and 22 and a pair of ducts 26 and 25 which pass longitudinally through the casing 18 and register with the ducts 10 in the supply pipe 3. Thus it will be seen that, under ordinary circumstances, the nitrogen and oxygen flowing through the pipes 21 and 22 will be discharged into the valve casing 2 from which they, in a co-mingled state will discharge through the outlet duct or passage 12. As before suggested, however, under certain conditions, the ports in the pressure reducing valves are prone to become clogged, in which case it becomes expedient to provide a by-pass 27 which will conduct the gases from the valve casing, 18 to the discharge pipe 4.

For the purpose of accommodating the by-pass 27 and for providing means whereby the use of the same may be controlled, I have provided the following means: One side of the casing 18 is provided with a laterally extending boss 28 through one side of which, an outlet duct 29 discharges, the inner end of said duct communicating with the enlarged end 30' of a bore 30 which is formed in said casing at right angles to the boss 28, said bore preferably having its end rounded as indicated at 31 to provide a valve seat. The outer portion of said bore is formed through an externally threaded boss 32 which is formed integrally with the casing 18, said boss carrying a stuffing box 33 through which a valve 34 projects, said valve having an operating handle 35 on its outer end while its inner end is rounded as at 36 for engagement with the seat 31 of the bore 30.

For the purpose of allowing the oxygen and nitrogen to pass from their respective ducts into the bore 30, I provide a pair of branch ducts 37 and 38 which establish communication between said bore and the ducts 25 and 26. Thus it will be seen that when the valve 34 is rotated in the proper direction, the gases are free to pass through the branch ducts 37 and 38 into the bore 30 from which they are discharged through the port 29 into the by-pass 27 through which they now flow and into the outlet pipe 4.

It is to be noted that the gases are not allowed to mix until they enter the enlarged end of the bore 30 where the mixing takes place in atmospheric proportion, this being allowed by the correct proportioning of the nitrogen and oxygen ducts. It is to be further noted, that, under ordinary circumstances, the reducing valve being in operation, all communication between the ducts 25 and 26 and the by-pass 27 may be obstructed by proper manipulation of the valve 34.

In addition to the features above described, the casing 18 is preferably provided with a third boss 38 which is disposed on the opposite side of the casing from the boss 28 and which has its extremity externally threaded as at 39 in order that a double acting pressure gage 40 may be connected thereto through the instrumentality of a coupling 41. Extending through the boss 38 and registering with suitable ports in the pressure gage 40, is a pair of branch ports 42 which establish communication between the interior of the gage and the nitrogen and oxygen ducts 25 and 26. It will therefore be seen that the pressure of the gases may be readily seen whether the latter are allowed to flow through the reducing valve or through the by-pass.

From the foregoing description taken in connection with the accompanying drawings, it will be seen that I have produced a valve for the purpose set forth which acts not only as a means for controlling the inlet of the by-pass 27 but which serves the purpose of a mixing chamber wherein the nitrogen and oxygen are proportionally mixed as before set forth.

Having thus described my invention, what I claim as new and desire to secure by Letters Patent is:

1. A by-pass valve comprising a casing having a pair of gas ducts, a boss on the casing and having a bore, branch ducts from the gas ducts to said bore, a second boss on the casing and having an outlet duct passing therethrough and communicating with said bore, a third boss on the casing having a pair of outlets leading from the gas ducts in advance of the branch ducts, said last mentioned boss being provided for the attachment of a double acting pressure gage, and a valve in said bore.

2. A valve for the purpose set forth comprising an elongated casing having a threaded bore in each end, longitudinal gas ducts establishing communication between said bores, a boss on one side of the casing and having a bore and a stuffing box, a valve in the bore and passing through the stuffing box, a second boss lying in the transverse plane of the aforesaid boss, and having an outlet duct leading from the bore therein, branch ducts from said gas ducts to said last mentioned bore and a third boss disposed in a transverse plane spaced from the aforesaid bosses and having a pair of outlets from said gas ducts.

3. A by-pass valve comprising a casing having a pair of gas ducts and a bore having its inner end enlarged and formed into a valve seat, a valve in said bore and shaped to conform to the seat, a pair of branch ducts from the gas ducts to the seat and a gas outlet from said enlarged end of the bore.

In testimony whereof I have hereunto set my hand in presence of two subscribing witnesses.

JOHN C. DUNCAN.

Witnesses:
OTIS F. GLENN,
H. O. MURPHY.